United States Patent Office 3,574,235
Patented Apr. 6, 1971

3,574,235
SEPARATION OF A MIXTURE OF DIASTEREO-ISOMERS OF ZEARALANOL
Vernon V. Young, Terre Haute, Ind., assignor to
Commercial Solvents Corporation
No Drawing. Filed June 6, 1967, Ser. No. 643,819
Int. Cl. C07d 9/00
U.S. Cl. 260—343.2     8 Claims

ABSTRACT OF THE DISCLOSURE

A mixture of diastereoisomers is formed when zearalenone is catalytically reduced to zearalanol in the presence of hydrogen. A portion of the high melting diastereoisomer can be separated out by known means. The remaining mixture can be separated into its constituents by dissolving the mixture in warm glacail acetic acid, cooling the solution, and then diluting the solution with water. The low melting isomer (155°–157° C.) crystallizes out when the solution is cooled and the high melting isomer (180°–181°C.) crystallizes out when the solution is subsequently diluted.

BACKGROUND OF THE INVENTION

(1) Field of the invention

This invention relates to a process for resolving a mixture of zearalanol into its components. The term zearalanol conforms with the nomenclature in an article in Tetrahedron Letters, Pergamon Press, Ltd., No. 27, pp. 3109–14 (1966).

(2) Description of the prior art

Compounds whose molecules contain the same number and kind of atoms arranged in the molecule in an identical manner except for their relative positions are termed stereoisomers. Two stereoisomers are called enantiomorphs or enantiomers when they are mirror images, have no plane of symmetry, and essentially differ only with respect to the direction in which they rotate the plane of polarized light, the angle of the crystal faces, and some related properties. Enantiomorphs have identical physical properties and nearly all of the chemical properties are also identical (the principal exception being reactions in biological systems catalyzed by enzymes). Enantiomorphs are also called optical isomers. Separation of enantiomorphs is generally referred to as resolution and can sometimes be accomplished biochemically or by manual sorting of crystals.

Stereoisomers which are not enantiomorphs (i.e., not mirror images) are called diastereoisomers, which is often shortened to diamers. Diastereoisomers usually differ in optical rotation, chemical and physical properties. A mixture of two diastereoisomers will have a melting point that differs from that of each of the diamers. Mixtures of diastereoisomers have, on occasion, been separated by fractional crystallization or fractional distillation.

SUMMARY OF THE INVENTION

When zearalenone, having the formula,

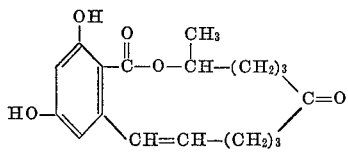

is converted to zearalanol, having the formula,

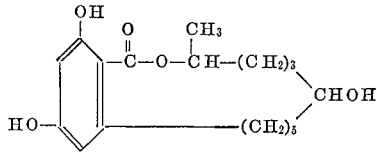

by the catalytic reduction of the olefinic bond and the ketone group in the presence of hydrogen, a mixture of diastereoisomers of zearalanol is formed. This reduction is disclosed in U.S. Pat. No. 3,239,345, issued on Mar. 8, 1966. The diastereoisomers differ in melting point. A portion of the higher melting diastereoisomer can be separated out utilizing a procedure disclosed in Example VI of U.S. Pat. No. 3,239,345. The remaining zearalanol still comprises a mixture of the diastereoisomers and the separation of this mixture into its constituents is the object of this invention.

This invention is directed to a method for separating a mixture of the high melting and the low melting diastereoisomers of zearalanol into its components, where zearalanol has the formula,

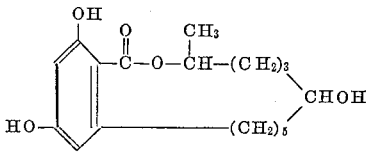

which comprises (a) dissolving the mixture in glacial acetic acid, (b) cooling the solution, and (c) separating the crystals of low melting diastereoisomer of zearalanol from the solution. After step (c), the separation of the crystals of the solution, the substantially crystal free solution can be diluted with water, and the crystals of high melting diastereoisomer of zearalanol separated from the solution. The glacial acetic acid in which the mixture of diastereoisomers is dissolved, step (a) may be at any suitable temperature. It is preferably warm glacial acetic acid above room temperature and more preferably above 50° C. The mixture of diastereoisomers dissolves more readily in warm glacial acetic acid as compared to cooler acid. After the mixture is dissolved in the glacial acetic acid, the solution is cooled, preferably at least 20 Centigrade degrees, and more preferably at least 30 Centigrade degrees whereupon crystals of low melting diastereoisomer of zearalanol form in the solution.

The mixture of diastereoisomers can be dissolved in glacial acetic acid in a ratio of mixture to acid of between about 10 grams per 100 ml. and about 20 grams per 100 ml., preferably about 15 grams per 100 ml. Both diastereoisomers of zearalanol are useful as anabolic and estrogenic substances for oral and parenteral administration to animals in the manner disclosed in U.S. Pat. No. 3,239,345, issued Mar. 8, 1966.

DETAILED DESCRIPTION OF THE INVENTION

A mixture of zearalanol can be prepared by, first, preparing and purifying zearalenone as described in Examples II and III of U.S. Pat. No. 3,239,345, issued Mar. 8, 1966, and then reducing the zearalenone to zearalanol as follows:

One gram of zearalenone was reduced in 150 cc. of ethanol at room temperature and 50 p.s.i. of hydrogen for 4 hours in the presence of a small amount of Raney nickel (about 1 cc. of a thick suspension in water). The product was concentrated, treated with 5 milliliters of isopropyl alcohol, cooled and filtered. The filtrate was mixed with 5 milliliters of water, left standing over night, cooled and filtered to provide 0.65 gram of product having a melting point of 147°–157° C. This product was recrystallized from isopropyl alcohol-water mixtures two times to provide 0.18 gram of a product having a melting point of 178°–180° C. A product having a melting point of 146°–148° C. and weighing 0.22 gram was also recovered from the filtrate after the first recrystallization of the product weighing 0.65 gram. The reduction of the ketone group introduces an asymmetric carbon atom and makes diastereoisomers possible. The optical activities of the two products were (1) for the product with a melting point of 178°–180° C., $[\alpha]_D^{25}$=about+46° eq. and (2) for the product with a melting point of 146°–148° C., $[\alpha]_D^{25}$= about + 39° eq., where $$[\alpha] = \frac{\alpha \cdot 100}{c \cdot 1}$$

c=1% in methanol and 1=2 dcm.

Product (1) is the pure, high-melting diastereoisomer of zearalanol. Product (2), which has a melting point of 146°–148° C., is a mixture of the two diastereoisomers of zearalanol, wherein the diastereoisomers are not present in equal molar amounts.

The process for resolving the mixture of zearalanol, namely, product (2) from above, is described more particularly in the following specific examples.

EXAMPLE I 3.0 grams of product (2), the mixture of zearalanols, and 30 ml. of glacial acetic acid were placed in a 100 ml. flask. The mixture was warmed on a steam bath to 60° C. to dissolve the mixture, cooled to room temperature of 28° C. and allowed to stand for 24 hours. The resultant crystals were separated by filtration from solution, rinsed with petroleum ether and dried. The dried crystals weighed 2.0 grams. The crystals were melted and re-solidified with loss of crystal luster. The melting point of the material was 152°–156° C. The material was recrystallized from chloroform. The melting point was 156°–157° C. The material was dried under reduced pressure, and in two tests the melting point was found to be 156°–157° C. and 155°–156° C. This material was the pure low melting diastereoisomer of zearalanol.

EXAMPLE II 50 grams of product (2) and 500 ml. of glacial acetic acid were placed in a one liter flask. The mixture was warmed to 60° C. to dissolve the zearalanols, cooled to room temperature of 28° C. and allowed to stand at 28° C. for 24 hours. The resultant crystals were separated by filtration from solution, rinsed with petroleum ether and dried. The dried crystals weighed 26.2 grams and had a melting point of 150°–155° C. A sample was further dried and the melting point was 153°–155° C. The total material was recrystallized from chloroform. The material weighed 19.0 grams and had a melting point of 155°–157° C. This material was the pure low melting diastereoisomer of zearalanol.

The acetic acid filtrate was stirred and diluted with three volumes of water. The resultant precipitate was isolated by filtration, rinsed with water and dried. The precipitate weighed 20.7 grams. The precipitate was recrystallized from a solution comprised of 100 ml. of methanol and 50 ml. of water. The recrystallized precipitate weighed 12.5 grams and had a melting point of 180°–181° C. This material was the pure high melting zearalanol.

EXAMPLE III

Example II was repeated several times but the high melting zearalanol after precipitation was recrystallized from the following solvents.

| Solvent: | Ratio of material to be recrystallized to solvent grams/100 ml. |
|---|---|
| Acetic acid | 20 |
| Ethyl acetate | 20 |
| Toluene | 4 |
| Chloroform | 1.3 |

It is claimed:
1. A method for separating a mixture of the high melting and the low melting diastereoisomers of zearalanol into its components, where the zearalanol has the formula:

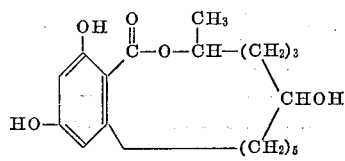

which comprises (a) dissolving the mixtures in glacial acetic acid, and (b) cooling the solution and precipitating crystals of the low melting diastereoisomer of zearalanol.

2. The method of claim 1 wherein the starting mixture is a mixture having a melting point between about 146° and about 148° C.

3. The method of claim 1 wherein the mixture is dissolved in glacial acetic acid in a ratio of mixture to glacial acetic acid of between about 10 grams per 100 ml. and about 20 grams per 100 ml.

4. The method of claim 1 wherein the glacial acetic acid in step (a) is above room temperature.

5. A method for separating a mixture of the high melting and the low melting diastereoisomers of zearalanol into its components, where the zearalanol has the formula:

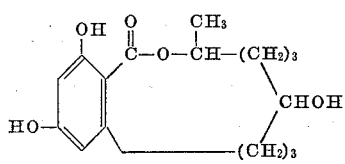

which comprises (a) dissolving the mixture in glacial acetic acid, (b) cooling the solution, (c) separating the crystals of low melting diastereoisomer of zearalanol from the solution, and (d) diluting the solution with water and precipitating crystals of the high melting diastereoisomer of zearalanol.

6. The method of claim 5 wherein the solution is diluted with about three volumes of water per volume of solution.

7. The method of claim 5 wherein the mixture is dissolved in glacial acetic acid in a ratio of mixture to glacial acetic acid of between about 10 grams per 100 ml. and about 20 grams per 100 ml. and the solution is diluted with about three volumes of water per volume of solution.

8. The method of claim 5 wherein the cooling is to the extent of at least 20 centigrade degrees.

References Cited

UNITED STATES PATENTS

| 3,239,344 | 3/1966 | Hodge et al. | 260—343.2X |
| 3,239,345 | 3/1966 | Hodge et al. | 260—343.2X |
| 3,239,355 | 3/1966 | Hodge el al. | 260—343.2X |

OTHER REFERENCES

Morrison et al.: Organic Chemistry, Allyn & Bacon, Boston (1959), pages 549–550.

JAMES A. PATTEN, Primary Assistant